United States Patent [19]

Roe et al.

[11] Patent Number: 5,415,795
[45] Date of Patent: May 16, 1995

[54] METHODS FOR CONTROLLING DUST IN HIGH TEMPERATURE SYSTEMS BY CONTACTING DUST WITH AN AQUEOUS SODIUM SILICATE SOLUTION

[75] Inventors: Donald C. Roe, Burlington, N.J.; Bradley J. Utzka, Philadelphia, Pa.

[73] Assignee: Betz Laboratories, Inc., Trevose, Pa.

[21] Appl. No.: 260,861

[22] Filed: Jun. 16, 1994

[51] Int. Cl.$^6$ ................................. C09K 3/22
[52] U.S. Cl. ........................ 252/88; 44/602; 427/212
[58] Field of Search ............ 252/88; 44/602, 500, 44/501; 427/221

[56] References Cited

U.S. PATENT DOCUMENTS

| | | | |
|---|---|---|---|
| 3,763,072 | 10/1973 | Krieger | 260/29.6 |
| 4,032,352 | 6/1977 | Pietsch | 106/78 |
| 4,316,811 | 2/1982 | Burns et al. | 252/88 |
| 4,369,121 | 1/1983 | Callahan et al. | 252/88 |
| 4,380,459 | 4/1983 | Netting | 55/87 |
| 4,663,067 | 5/1987 | Mallow et al. | 252/88 |
| 4,746,543 | 5/1988 | Zinkan et al. | 427/212 |
| 4,780,143 | 10/1988 | Roe | 106/102 |
| 4,801,635 | 1/1989 | Zinkan et al. | 252/88 |
| 5,271,859 | 12/1993 | Roe | 252/88 |
| 5,302,308 | 4/1994 | Roe | 252/88 |

FOREIGN PATENT DOCUMENTS

| | | |
|---|---|---|
| 2524899 | 10/1983 | France . |
| 2401217 | 7/1975 | Germany . |
| 51-009103 | 1/1976 | Japan . |
| 1033771 | 8/1983 | U.S.S.R. . |
| 1086184 | 4/1984 | U.S.S.R. . |
| 1116179 | 9/1984 | U.S.S.R. . |
| 1509547 | 9/1989 | U.S.S.R. . |

*Primary Examiner*—Prince Willis, Jr.
*Assistant Examiner*—James M. Silbermann
*Attorney, Agent, or Firm*—Alexander D. Ricci; Steven D. Boyd

[57] ABSTRACT

Method for inhibiting dust emissions from hot (>150° F.) substrates are provided which comprise adding to the substrate an aqueous solution of sodium silicate.

8 Claims, No Drawings

METHODS FOR CONTROLLING DUST IN HIGH TEMPERATURE SYSTEMS BY CONTACTING DUST WITH AN AQUEOUS SODIUM SILICATE SOLUTION

FIELD OF THE INVENTION

The present invention relates to improved methods for reducing the dustiness of hot particulate solids. More particularly, the present invention relates to the use of sodium silicate compositions for reducing the dustiness of hot particulate solids.

BACKGROUND OF THE INVENTION

Dust control, as used herein, is defined as the prevention or reduction of the extent to which fine particulates become airborne or suspended in air. Dust is generated in significant quantities during the mining, handling, transportation, and storage of coal; dust is also generated during the processing, transportation, and handling of rock, green and calcined petroleum coke, mineral ores (for example iron ore), grains, limestone, gypsum, fly ash, cement clinker, and fertilizers such as potash and phosphates, among others.

Industrial sources of fugitive dust include open operations, leaks and spills, storage, disposal, transit or poor housekeeping of sundry finely divided solid particulates. The iron and steel industries are replete with examples of the above enumerated categories. Wind erosion of exposed masses of particulate matter such as coal, mine mill tailings, or fertilizer, etc., causes both air pollution and economic waste. Detrimental effects on health and cleanliness result where the fine particles are carried aloft by winds.

Hot substrates (greater than 100° C.) pose a more difficult problem for controlling dust emissions than substrates at ambient temperatures. Water can be used for dust control at ambient temperatures. However, at elevated temperatures, water evaporates quickly, and loses effectiveness at controlling dust emissions.

U.S. Pat. No. 4,780,143 discloses a foamed dust control agent which suppresses dust generation from cement clinker. The foam contains an antifoaming agent which acts to inhibit foam formation in the slurried cement. U.S. Pat. No. 5,271,859 discloses a method for inhibiting dust emission from hot (250° F.) solids which comprises adding to the solids an aqueous or foamed solution of a cellulose derivative compound. U.S. Pat. No. 5,302,308 discloses a method for inhibiting dust emissions from hot (>120° F.) substrates which comprises adding to the substrate an aqueous or foamed solution of polyethylene oxide or a polyethylene oxide derivative.

The use of organic compounds as dust control compositions on high temperature substrates is typically ineffective or has negative side effects. At high substrate temperatures, such as temperatures above about 100° C., organic compositions can be subject to decomposition which may adversely affect dust control and can result in undesirable conditions such as odors, etc.

The use of silicate in combination with a dimethylvinylpyridine latex binding agent is disclosed in Soviet Union Patent 1,509,547. The combination is disclosed as useful in reducing dust emissions from mineral dumps, tailing dumps, power plant ash and sloping banks or roads. The combination is applied at temperatures above about 10 to 20° C. Soviet Union Patent 1,116,179 discloses a dust suppressing combination of sodium silicate and acidic tar from raw benzene rectification. The combination is employed to suppress dust in mining of mineral ores. Soviet Union Patent 1,086,184 discloses a dust control combination of sodium silicate and a copolymer of methacrylic acid and methacrylamide as a binding agent. The use of a combination of gossypol resin modified with sodium silicate and sulfite yeast liquor modified with sodium silicate is disclosed in Soviet Union Patent 1,033,771. French Patent 2,524,899 discloses a dust control composition which comprises an emulsifiable mineral oil, CMC, a nonionic wetting agent, a plasticizer, water and optionally sodium silicate. The material is used to control dust on unsurfaced roads. U.S. Pat. No. 4,032,352 discloses a binder for mineral ore fines comprising pitch, hydrated lime and/or moist mill scale and sodium silicate in water. The binder is used in forming briquettes of mineral ores. Japanese application (Kokai) 51009103 discloses treatment of peat with sodium silicate to form a colloidal slurry which can be shaped and dried or used as a binder for coal dust.

German Patent 2,401,217 discloses the use of sodium silicate as a binder in the formation of briquettes of $SiO_2$, $Fe_2O_3$, $Al_2O_3$, $CaO$, $MgO$ and $C$ for use in the production of Si. U.S. Pat. No. 3,763,072 discloses a treatment for forming a semi-impervious crust on soil which comprises an aqueous emulsion of a homopolymer of a lower alkyl ester of acrylic acid or of an alpha-lower alkyl acrylic acid or a copolymer of the esters and sodium silicate.

SUMMARY OF THE INVENTION

The present invention provides a method for reducing dust generation from hot particulate solids by applying a treatment comprising sodium silicate. The hot particulate treated in accordance with the present invention are materials having a temperature above about 100° C. such as hot cement clinker and taconite pellets. The sodium silicate treatment for high temperature substrates of the present invention may be employed in combination with additives which enhance performance or aid in application. Potential additives can include surfactant wetting or foaming agents to improve spraying or foam application techniques; plasticizers to alter set time, tackiness and flexibility of the treatment; and waterproofing agents to improve long-term dust suppression when the treated substrate is exposed to moisture.

DETAILED DESCRIPTION OF THE PREFERRED EMBODIMENT

The present invention relates to methods for reducing dust emissions from high temperature solids comprising applying to the solids a dust inhibiting amount of a sodium silicate.

For purposes of this application, "high temperature solids" are meant to include particulate solids at temperatures greater than about 100° C. The present invention is particularly effective for particulate solids at temperatures greater than about 150° C., where prior art water sprays or foams are rendered virtually ineffective due to the rapid evaporation of water at these temperatures. The method of the present invention can be employed with most high temperature substrates with the capacity for generating fugitive dust emissions. This can include substrates at temperatures up to about 500° C.

The sodium silicates, also known as water glass, employed are preferably derived from water soluble sodium silicate glasses. They are typically solutions of sodium oxide ($Na_2O$) and silicon dioxide ($SiO_2$) combined in various ratios. Examples of acceptable sodium silicates include Sodium Silicate D, Sodium Silicate K and Sodium Silicate N available from the PQ Corporation.

The sodium silicate treatment of the present invention may be applied in a water based treatment solution. The sodium silicate, as an inorganic material, resists degradation when applied to high temperature substrates. Furthermore, when applied to cement clinker, there are no adverse effects on cement quality. Often air entrapment in cement mortar is a typical side effect of prior art dust suppression chemicals.

The sodium silicate treatments of the present invention generally have $SiO_2$ to $Na_2O$ weight ratios in the range of about 1.60 to 3.85. The preferred range of $SiO_2$ to $Na_2O$ weight ratios ranges from about 2.00 to 3.22. The % solids of the sodium silicate treatments can range from about 10% to 50% and preferably is from about 25% to 40%.

The sodium silicate treatments of the present invention may be applied to the high temperature substrates by either spraying as a liquid on to the high temperature substrate or by applying as a foam which incorporates an effective surfactant based foaming agent. The treatments, whether spray or foam, may also include additives to enhance performance of the dust control activity. For example, plasticizers can be added which will alter the set time, tackiness and flexibility of the sodium silicate binder. Possible plasticizing agents include sugars (molasses and crude lignosulfonates) glycerin and glycols. Waterproofing agents may also be added to improve long-term dust suppression when the treated material is exposed to moisture. Potential waterproofing agents include proteins, polymers, and heavy metal oxides.

When the sodium silicate treatment is to be applied as a spray, surfactant wetting agents may be added to the treatment solution to improve spray atomization and wetting properties of the liquid solution. Preferred surfactant wetting agents are anionic and nonionic surfactants and their blends such as sodium dioctyl sulfosuccinates and ethoxylated alcohols.

When the sodium silicate treatment is to be applied as a foam, surfactant foaming agents are added to the treatment solution to facilitate foam formation. Anionic surfactants and their blends, including salts of alkyl benzene sulfonates, alkyl ether sulfates, alpha olefin sulfonates and alpha sulfo methyl esters are preferred.

Aqueous solutions of from about 0.1% to 10.0% sodium silicate can be sprayed or foamed onto the high temperature substrate in accordance with the present invention. The feed rate of sprayed aqueous solution can range from about 0.1 to 10.0 gallons of solution per ton of substrate. Preferably, 0.5 to 5.0 gallons per ton of substrate are applied. When applied as a foam, the sodium silicate treatment is fed in a range of from about 0.05 to 5.0 gallons of foamed solution per ton of substrate. Preferred foam feed rates range from about 0.25 to about 25 gallons per ton of substrate.

The sodium silicate treatments of the present invention are effective at providing dust control for a variety of high temperature substrates such as cement clinker, hot taconite pellets and other inorganic materials subjected to thermal drying and calcining processes.

The present invention will now be further described with reference to a number of specific examples which are intended to be illustrative and not as restricting the scope of the present invention.

Efficacy testing of sodium silicate dust control treatments in accordance with the present invention in comparison to prior art dust control treatments on high temperature substrates was undertaken. The evaluation comprised treatment of a high temperature substrate with the treatment solution in a rotating drum agglomerator. Percent dust suppression was determined by measuring the relative dustiness of the treated samples compared to control (untreated) samples using a laboratory dust chamber (modified ASTM dust box). Percent dust suppression (%DS) was calculated based upon the relative dustiness index (RDI) of treated and untreated samples according to the formula $$\% \ DS = \frac{\text{untreated } RDI - \text{treated } RDI}{\text{untreated } RDI} \times 100.$$

Relative dustiness measurements were made immediately following treatment and after 24 hours of heating at 200° C. The following dust control treatments were tested.

TABLE I

| Treatment | Trade Name* | Composition |
|---|---|---|
| A | FlowPro 1512 | Sodium lignosulfonate |
| B | FlowPro 1505 | Petroleum resin emulsion |
| C | FlowPro 9119 | Borated polyvinyl alcohol |
| D | FlowPro 9136 | Latex emulsion |
| E | Vinol 540 | Polyvinyl alcohol |
| F | Carbowax PEG 4600 | Polyethylene glycol |
| G | Polyox WSR 205 | Polyethylene oxide |
| H | Methocel K4M | Carboxymethylcellulose |
| I | Methocel J5MS-N | Carboxymethylcellulose |
| J | Methocel J4OMS-N | Carboxymethylcellulose |
| K | Methocel J75MS-N | Carboxymethylcellulose |
| L | Sodium Silicate D | Sodium silicate |
| M | Sodium Silicate K | Sodium silicate |
| N | Sodium Silicate N | Sodium silicate |

*FlowPro products are available from Betz Laboratories, Inc.
Vinol 540 is available from Air Products.
Carbowax PEG 4600 is available from Union Carbide
Polyox WSR 205 is available from Union Carbide.
Methocel products are available from Dow.
Sodium Silicate D, K and N are available from PQ Corporation.

Example 1

Dust control treatments were evaluated for dust suppression efficacy on 350° C. taconite pellets. The treatments were applied to the hot taconite by spraying solutions onto the pellets in a rotating drum agglomerator. Feed rates were the equivalent to 5 gallons of solution per ton of substrate with the treatments applied at an equal cost basis. Table II summarizes the results.

TABLE II

| Treatment | % Dust Supression (Immediate) | % Dust Suppression (24 hrs @ 200° C.) | Observations |
|---|---|---|---|
| A | 98 | 80 | Burning odor |
| B | 89 | 23 | Smoking; oily odor |
| D | 99 | 0 | Slight odor |
| E | 89 | 63 | Acetate odor |
| F | 84 | 0 | None |
| G | 78 | 0 | None |
| H | 88 | 71 | None |
| I | 78 | 73 | None |
| J | 37 | 57 | None |

TABLE II-continued

| Treatment | % Dust Supression (Immediate) | % Dust Suppression (24 hrs @ 200° C.) | Observations |
|---|---|---|---|
| K | 56 | 56 | None |
| L | 76 | 80 | None |
| M | 81 | 85 | None |
| N | 81 | 90 | None |

Table II shows that all of the tested treatments exhibited efficacy immediately after being applied. However, after storage, the sodium silicate treatments retained their dust control efficacy without any adverse effects indicative of degradation.

Example 2

Dust control treatments were evaluated for dust suppression efficacy on 175° C. cement clinker. The treatments were applied by spraying solutions onto hot clinker in a rotating drum agglomerator. The feed rate was equivalent to 2.5 gallons of treatment solution per ton of substrate with the treatments applied at an equal cost basis. Results are summarized in Table III.

TABLE III

| Treatment | % Dust Suppression |
|---|---|
| B | 22.5 |
| A | 55.0 |
| C | 31.6 |
| D | 43.7 |
| N | 40.8 |

The results show that all treatments exhibit some dust control activity. However, all of the treatments except treatment N (sodium silicate) are organic materials that have the potential for thermal decomposition and to effect cement quality when the clinker is used to prepare finished cement.

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of reducing the emission of dust from high temperature particulate solids having a temperature above about 100° C. contacting the bulk of the particulate solids with an aqueous solution consisting essentially of sodium silicate.

2. The method of claim 1 wherein said sodium silicate is added to said solids as a sprayed liquid.

3. The method of claim 1 wherein said sodium silicate is added to said solids as a foamed liquid.

4. The method of claim 1 wherein said solids are selected from the group consisting of hot taconite pellets and cement clinker.

5. The method of claim 1 wherein said sodium silicate is added to said solids with surfactant foaming agents.

6. The method of claim 1 wherein said sodium silicate is added to said solids with surfactant wetting agents.

7. The method of claim 1 wherein said sodium silicate is added to said solids with plasticizers.

8. The method of claim 1 wherein said sodium silicate is added to said solids with waterproofing agents.

* * * * *